United States Patent
Ross

(10) Patent No.: US 9,158,597 B2
(45) Date of Patent: Oct. 13, 2015

(54) CONTROLLING ACCESS TO SHARED RESOURCE BY ISSUING TICKETS TO PLURALITY OF EXECUTION UNITS

(75) Inventor: Jonathan Ross, Woodinville, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 374 days.

(21) Appl. No.: 13/179,344

(22) Filed: Jul. 8, 2011

(65) Prior Publication Data

US 2013/0014120 A1    Jan. 10, 2013

(51) Int. Cl.
*G06F 9/46*    (2006.01)
*G06F 9/52*    (2006.01)

(52) U.S. Cl.
CPC .......... *G06F 9/526* (2013.01); *G06F 2209/522* (2013.01)

(58) Field of Classification Search
CPC .................... G06F 9/52; G06F 9/526
See application file for complete search history.

(56) References Cited

U.S. PATENT DOCUMENTS

| | | | |
|---|---|---|---|
| 7,529,844 B2 | 5/2009 | Radovic et al. | |
| 7,698,523 B2 | 4/2010 | Pong | |
| 2003/0195920 A1* | 10/2003 | Brenner et al. | 709/107 |
| 2004/0098723 A1* | 5/2004 | Radovic et al. | 718/104 |
| 2004/0215858 A1* | 10/2004 | Armstrong et al. | 710/200 |
| 2007/0300226 A1* | 12/2007 | Bliss | 718/100 |
| 2008/0098180 A1* | 4/2008 | Larson et al. | 711/150 |
| 2010/0250809 A1 | 9/2010 | Ramesh et al. | |
| 2011/0072241 A1 | 3/2011 | Chen et al. | |
| 2011/0252166 A1* | 10/2011 | Padala et al. | 710/74 |

OTHER PUBLICATIONS

Radovic, Zoran et al., "Hierarchical Backoff Locks for Nonuniform Communication Architectures," Department of Information Technology, Uppsala University, (downloaded from http://citeseerx.ist.psu.edu/viewdoc/download?doi=10.1.1.13.5657&rep=rep1&type=pdf), Feb. 8-12, 2003, (12 pages), Uppsala, Sweden.
Parson, Dale, "Real-time Resource Allocators in Network Processors using FIFOs," Agere Systems, (downloaded from http://www.ece.northwestern.edu/EXTERNAL/anchor/ANCHOR04/final_manuscripts/paper_7.pdf), Jun. 19, 2004, (9 pages).
Corbet, Jonathan, "Ticket spinlocks," Eklektix, Inc., (downloaded from http://lwn.net/Articles/267968/), Feb. 6, 2008, (5 pages).

* cited by examiner

*Primary Examiner* — Meng An
*Assistant Examiner* — James J Lee
(74) *Attorney, Agent, or Firm* — Steve Wright; Judy Yee; Micky Minhas

(57) ABSTRACT

Access to a shared resource by a plurality of execution units is organized and controlled by issuing tickets to each execution unit as they request access to the resource. The tickets are issued by a hardware atomic unit so that each execution unit receives a unique ticket number. A current owner field indicates the ticket number of the execution unit that currently has access to the shared resource. When an execution unit has completed its access, it releases the shared resource and increments the owner field. Execution units awaiting access to the shared resource periodically check the current value of the owner field and take control of the shared resource when their respective ticket values match the owner field.

12 Claims, 4 Drawing Sheets

CONTROLLING ACCESS TO SHARED RESOURCE BY ISSUING TICKETS TO PLURALITY OF EXECUTION UNITS

BACKGROUND

Multiple computer programs, processes, applications, and/or threads running on a computer or processor often need to access shared data or hardware, such as a memory block, register, device driver, or other common resource. To avoid data collisions and data corruption, locks are typically used to limit access to a shared resource to only one process at a time. This prevents multiple users from concurrently modifying the same shared data. For example, a group of processes may each have to acquire a lock before accessing a particular shared resource. When one process has acquired the lock, none of the other processes can acquire the lock, which provides exclusive access and control of the shared resource to the process that first acquired the lock.

Where multiple execution units try to acquire the same lock, the ability to acquire the lock may depend in part upon how fast an execution unit accesses the lock and how often the execution unit reattempts to acquire the lock when a first attempt is unsuccessful. For example, an execution unit that is remote from other execution units may be at a disadvantage due to the transmission delay of lock acquisition signals compared to the delays associated with closer execution units. If two units begin an attempt to acquire the lock at approximately the same time, the closer execution unit is likely to always have its request arrive first, and requests from a farther execution unit are likely to be too late. Additionally, when an execution unit cannot acquire a lock that was already in use by another device, the execution unit may back off for a period and will reattempt to acquire the lock at a later time. In the meantime, other devices may acquire the lock before the execution unit has reattempted acquiring the lock. As a result, if a number of other devices are attempting to acquire the lock, the execution device may have difficulty acquiring the lock in a timely manner.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Access to a shared resource by a plurality of execution units is organized and controlled by issuing tickets to each execution unit as they request access to the resource. The tickets are issued by a hardware atomic unit so that each execution unit receives a unique ticket number. A current owner field indicates the ticket number of the execution unit that currently has access to the shared resource. When an execution unit has completed its access, it releases the shared resource and increments the owner field. Execution units awaiting access to the shared resource periodically check the current value of the owner field and take control of the shared resource when their respective ticket values match the owner field.

Existing mechanisms require cache coherence to control ticket generation. Increasing cache coherence requirements limit scalability in the system. The mechanism described herein allows, through implementation of the hardware atomic unit, scalable non-cache coherent systems that still support an efficient shared resource arbitration mechanism.

In one embodiment, multiple execution units may access the shared resource concurrently. The execution units determine if they are allowed to access the shared resource by determining if their unique ticket number is within a concurrency number of the owner field value.

The execution units release the shared resource upon completion of their required access. The execution units increment the owner field value after releasing the shared resource.

In one embodiment, the execution units identify a last ticket number issued by the hardware atomic unit. The execution units compare the last issued ticket number to a number one less than the current value of the owner field. If the last issued ticket number is equal to the number one less than the current owner field value, then the execution unit may expect to achieve immediate access to the shared resource and, therefore, requests a new unique ticket from the hardware atomic unit. If the last issued ticket number is not equal to the number one less than the current owner field value, then the execution unit does not expect to achieve immediate access to the shared resource and, therefore, does not request a new unique ticket from the hardware atomic unit.

DRAWINGS

DETAILED DESCRIPTION

Figure 1:
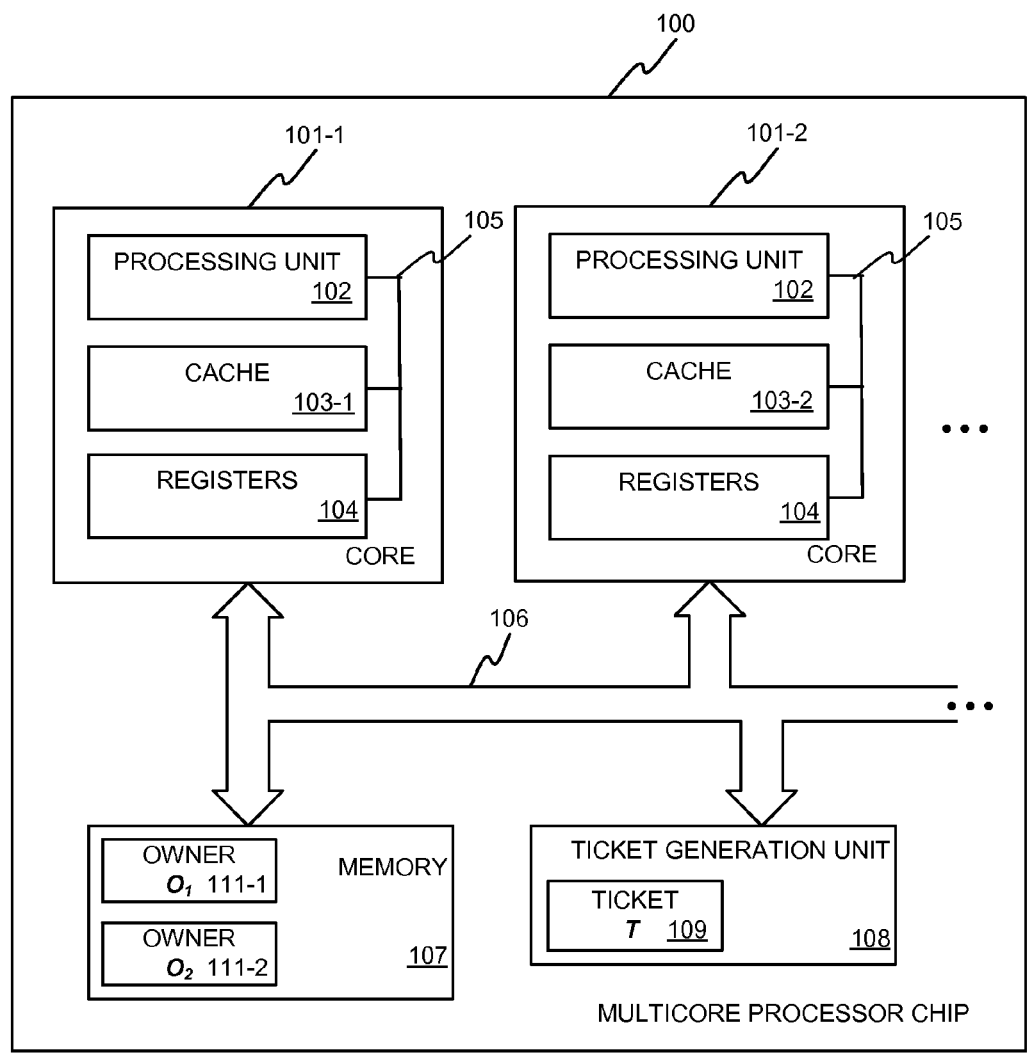
FIG. 1 illustrates a multicore processor chip according to an example embodiment.

FIG. 1 illustrates a multicore processor chip 100 having cores 101. Although only two cores 101-1, 101-2 are illustrated, it will be understood that chip 100 may have any number of cores 101. Each core 101 has a processing unit 102, a cache 103, and configuration registers 104. Core bus 105 provides a communication medium for the components of core 101. Cores 101 communicate via a chip bus 106. Cores 101 may also access an on-chip memory 107 using chip bus 106. One core 101-1 may access and manipulate the cache 103 of another core 101-2. Often, intra-core communications on bus 105 will be faster than inter-core communications on bus 106. Multicore chip 100 may have a coherency protocol or a locking mechanism to allow multiple cores 101 to manipulate a cache 103 or memory 107 in a coherent and deterministic manner. Alternatively, FIG. 1 may be a system with any form of parallel independent processing. It will be understood that the present invention is not limited to applications on a multi-core chip.

Shared data or resources, such as shared memory 107 or shared cache 103, may be simultaneously required for two or more execution units, such as threads, applications, or processes. In prior systems, an atomic lock is often used to prevent data collisions where two execution units attempt to access the shared resource at the same time. For example, an atomic lock instruction is implemented when a first device accesses the shared resource, which prevents other devices from accessing the shared resource or changing the lock state. The lock is a hardware atomic primitive that provides mutual exclusion among the execution units. An execution unit that requires exclusive access to a shared resource will repeatedly request access until the request is granted. The waiting execution unit may use any one of a number of well-known mechanisms to reduce communication resource consumption while requesting access. For example, the waiting execution unit may issue a new request at regular intervals, or the execution unit may use exponential back-off to determine when to issue new requests.

However, there are a certain problems with the mechanisms used in the prior systems. One problem involves the timing requests to access the resource. A requesting execution unit, such as a processor or thread, may attempt to reduce communication congestion by backing off on its retry interval. In this case, as the requesting execution unit uses longer periods between attempts to access the resource, it allows other devices more opportunities to acquire the desired resource instead. As a result, by backing-off, the requesting execution unit is at a disadvantage compared to other requests that arrive soon after the release of the resource.

For example, two threads A and B may be waiting for a resource while a third thread C currently owns the resource. Thread A tries to acquire the resource, but is denied since the resource is owned by C. After a brief interval of trying to access the resource, thread A backs off and waits for a number of cycles before trying again. While thread A is waiting to re-try its access, thread C releases the resource and thread B begins attempts to access the resource. Thread B, which started its attempts to access the resource after thread A, will acquire the resource before thread A.

Another problem involves differences in access latencies within hardware implementing the request. For systems with non-uniform access latency among components, requesting execution units that are further away from the atomic lock hardware are at a disadvantage due to propagation delay of the request. As a result, a more remote execution unit may be starved for forward progress by requesters that are closer to the resource.

For example, three threads A, B, and C may be waiting for a resource, and thread C may have longer access latency for the resource than either thread A or B. If all three threads contend for the resource, then thread A or B will be more likely to acquire the resource than thread C. Moreover, in the event that thread A acquires the resource and threads B and C continue to contend for access, when A releases the resource, then thread B will be more likely to acquire the resource than thread C. Furthermore, in the event that thread A attempts to acquire the resource again before B releases the resource, when B releases the resource, then thread A will again be more likely to acquire the resource than thread C because of thread A's proximity. As a result, threads A and B may starve thread C from resource access and may limit thread C's forward progress.

In one embodiment, requesters' access requests for a shared resource are ordered to make the access process fairer. A hardware device dispenses "tickets" that guarantee a spot in a queue of requesting threads. An owner field identifies the current owner of the shared resource—like a "now serving" sign—and is used to indicate which ticket currently owns the resource. When a requesting thread sees the value of its ticket in the owner field, then that thread has exclusive access to the associated resources.

Chip 100 includes ticket generation unit 108 that generates tickets 109. Ticket generation unit 109 is a hardware atomic primitive that returns a value T, which is an atomically incremented number. The atomic increment of T in each ticket 109 is suited to non-coherent systems as there is no requirement to gain ownership of a cache-line or bus-lock. Chip 100 may have multiple shared resources, such as cache 103-1, 103-2.

Chip 100 further comprises Owner storage locations 111 associated with each shared resource. Owner storage locations 111 may be any dedicated hardware location or a software-determined general-purpose memory location. For example, the owner storage location may be a direct-map cache location, a hardware register, or a memory location.

The Owner storage location 111 identifies the resource owner. The value O in storage location 111 indicates the ticket value T for the current owner of the associated resource. If the shared resource is to be initialized as available, then the value O 111 is initialized to contain the next value T 109 that will be returned from the ticket generation unit 108. If a resource is to be initialized as already held, then O 111 is set to a value that is one less than the next value T 109 to be returned from the ticket generation unit 108.

A thread X that requires access to a shared resource first requests a ticket from ticket generation unit 108. Ticket generation unit 108 issues a ticket $T_X$ to thread X and then atomically increases the hardware counter 109. Thread X compares the value of the ticket $T_X$ to the current owner O value 111 for the shared resource. If the value of O 111 does not match the ticket $T_X$, then thread X periodically reads the value O 111 for the resource until O 111 matches the waiting thread's ticket value $T_X$. When O matches the ticket value $T_X$, thread X then owns the shared resource and can operate upon or interact with the shared resource accordingly. When thread X is finished with the resource, it increments O 111, which effectively passes ownership of the resource to the next waiting thread. Owner field O 111 can be considered as protected by the resource and, therefore, does not require atomic accesses or special hardware support for updating O 111.

Conditional Acquisition

Once a waiting thread is granted a ticket T, the thread must continue waiting until it obtains the resource and then must increment O 111 when finished. Conditional acquisition may be implemented using compare-and-swap hardware to issue a ticket T 109 only if an incremented T matches the current value in O. The conditional sequence, with the hardware compare-and-swap as the atomic step, is:

```
Owner = O;           // read by software
P = O−1;             // what T must be for conditional wait to succeed
Y = Atomic(P, Owner) {
    if (P == T) {
        T = O + 1;   // increment
        Return P;
    } else {
        return T;
    }
}
```

If Y—the returned value—is equal to P, then the resource has been acquired, otherwise the resource has not been acquired and a ticket has not been granted.

In one embodiment, once an execution unit has taken a ticket, it must continue to monitor the current value of the owner field O and, when its ticket value T equals the owner field value O, the execution unit must access the resource or—at a minimum—increment the owner field value if it does not access the resource. An execution unit cannot ignore the owner field after it has taken a ticket, or the resource will become stalled and other devices will not be able to access the resource until the execution unit updates the owner field and allows the next device in line to access the resource.

Variable Concurrency Level

The example above has a concurrency level of one, meaning only one thread may access to the resource at a time. To avoid stalling the resource and/or to allow multiple concurrent users, if supported by the resource, the ticket/owner mechanism described herein may be generalized to an arbitrary concurrency level. For a concurrency level "N"—where N threads are allowed to operate concurrently—a thread is allowed to access the resource if: T−O<N.

Because multiple threads operate concurrently on the same shared resource, the update of O 111 must be performed atomically. In one embodiment, a hardware mechanism identical to ticket generation unit, which provides an atomic update for T, can be used to update O. Alternatively, because the return value of O is not required, the hardware atomic mechanism for updating O may be configured to provide no return value. In one embodiment, the mechanism for updating O may be streamlined as a write for which the thread does not need to wait for completion.

Figure 2:
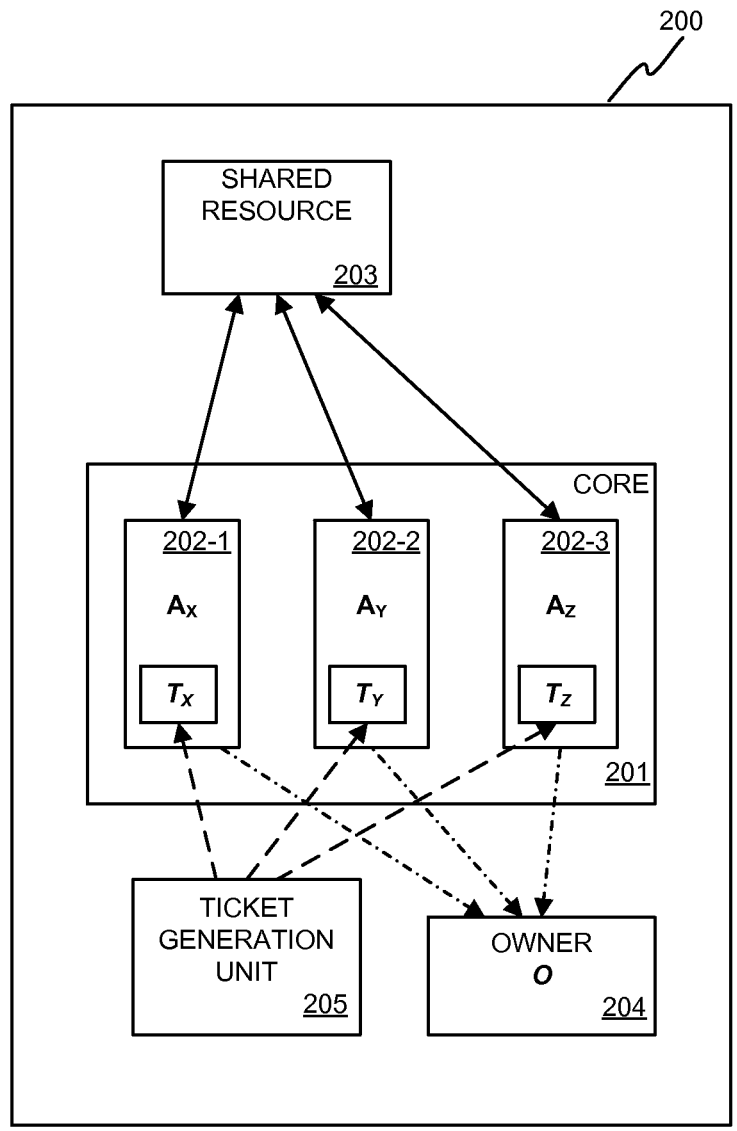
FIG. 2 illustrates a system, such as a multicore processor, comprising a core running a plurality of applications or threads according to one embodiment.

FIG. 2 illustrates a system 200, such as a multicore processor, comprising a core 201 running a plurality of applications or threads $A_{X-Z}$ 202. System 200 includes a shared resource 203 that is used by each of the threads $A_{X-Z}$ 202. Owner field 204 identifies the current owner of shared resource 203. Each of the threads $A_{X-Z}$ 202 may access ticket generation unit 205 to request a ticket T to access shared resource 203. Each thread $A_{X-Z}$ 202 compares its ticket, $T_{X-Z}$, to owner field O 204 to determine if it is allowed to access shared resource 203.

For the case of concurrency level of 1 (N=1), each thread $A_{X-Z}$ 202 evaluates whether its ticket is equal to the owner field 204 ($T_{X-Z}$=O) and whichever thread has the matching ticket is allowed to access shared resource 203.

For the case of concurrency level N, each thread $A_{X-Z}$ 202 compares its ticket $T_{X-Z}$ to the owner field and evaluates whether it meets the criteria T−O<N. Any of the threads $A_{X-Z}$ 202 that have a ticket $T_{X-Z}$ that is within N of O is allowed to access shared resource 203.

Using the shared resource access mechanisms described herein provides the following benefits:
1) Threads gain access to the shared resource in the order in which they present their first request to the ticket-generating hardware atomic unit.
2) Communication traffic to the hardware atomic unit is greatly reduced because only one reference per lock acquisition is required without regard to the level of contention.
3) Back-off mechanisms implemented by threads waiting for resource ownership to be passed to them do not subject those threads to fairness imbalances caused by the waiting patterns or inter-arrival rates of other threads.
4) Latency to the hardware atomic unit determines, at most, which position in line—or which ticket number—is granted to a thread, but such latency will not lead to starvation or a continuing arbitration disadvantage.

Implementation Considerations

In one embodiment, the width—in bits—of the atomic counter that is used to generate the tickets should be wide enough to count the maximum number of threads, which may be determined by the number of waiting threads plus the concurrency level. The minimum number of bits is equal to: log 2(maximum number of threads plus concurrency level), where the maximum number of threads is rounded up to the next power of 2. For example, if the maximum number of threads is 64, then the bit-width must be at least six bits–log 2(64)=6. In some embodiments, this is the number of hardware threads or logical processors in the system.

In some embodiments, the atomic increment is implemented as a read to a defined address, which returns an atomically incremented number.

In some embodiments, the owner field is implemented as regular memory or as dedicated hardware storage.

In other embodiments, releasing a concurrency level 1 resource can be a non-atomic or an atomic increment of the owner field value O.

In other embodiments, releasing a resource is implemented as a load, increment, store, or as one transaction that causes hardware to increment O, thereby reducing the number of hardware transactions required to release the resource.

Figure 3:
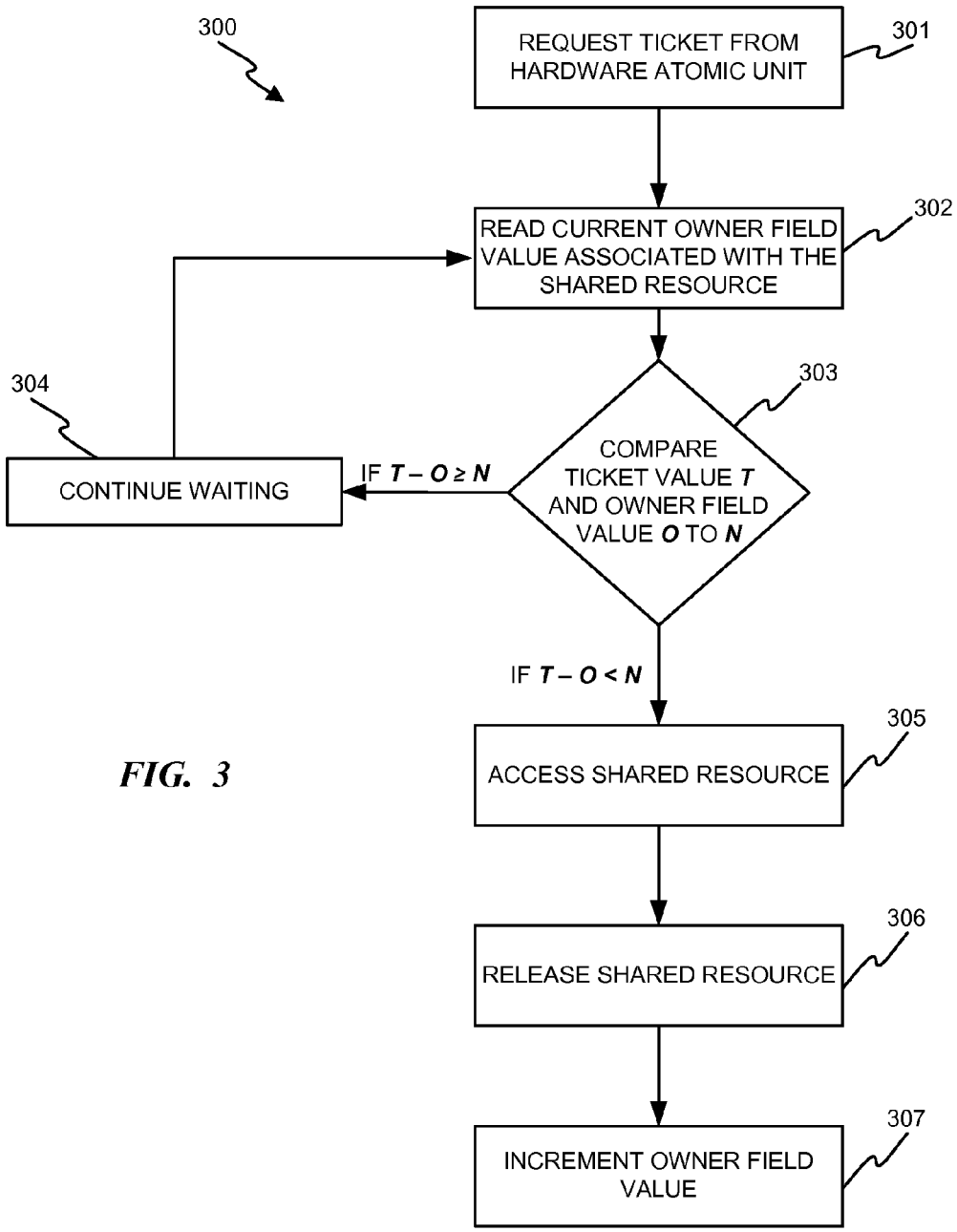
FIG. 3 is a flowchart illustrating a process for providing fair access to a shared resource.

FIG. 3 is a flowchart 300 illustrating a process for providing fair access to a shared resource. The process illustrated in FIG. 3 may be applied to a shared resource that may be accessed by one or many execution units at the same time. The concurrency parameter—N—is the number of execution units that may simultaneously access the shared resource. For concurrency of one, as discussed above, N=1. In step 301, an execution unit, such as an application, thread, or process that requires access to the shared resource, requests a ticket from a hardware atomic unit configured to distribute tickets having unique values. The shared resource may be hardware or data, such as a memory block, register, device driver, or other resource. In step 302, the execution unit reads or otherwise obtains the current value of the owner field associated with the shared resource. The owner field identifies the ticket value of the execution unit that is currently in control of the shared resource.

In step 303, the execution unit compares the ticket value (obtained in step 301) and the current owner field value (read in step 302) to the concurrency level N for the shared resource. If T−O≥N, then the execution unit's ticket is not yet "up" and the execution unit moves to step 304 and continues to wait. The execution unit then returns to step 302 where it obtains a new current value of the owner field. The process then continues to the comparison in step 303. In step 304, the execution unit may immediately move to step 302 to obtain an updated owner field value, or the execution unit may delay for a predetermined period before moving back to step 302. The predetermined period may be a fixed or variable interval. For example, the execution unit may use a backoff procedure to adjust the predetermined period, which may be employed to minimize traffic on a communication bus and/or to avoid collisions with other execution units that may be reading the owner field.

If the difference between the values of the ticket and the owner field are less than the concurrency level (i.e. T−O<N), then the process moves to step 305 and the execution unit is granted access to the shared resource. If the shared resource has a concurrency level of one (N=1), for example, then the execution unit is granted access when the ticket and owner field values are the same (i.e. when T=O, then T−O=0<N=1).

After the execution unit has completed its use of the shared resource, the process moves to step 306 where the execution unit releases the shared resource and then to step 307 where the execution unit increments the owner field value.

Figure 4:
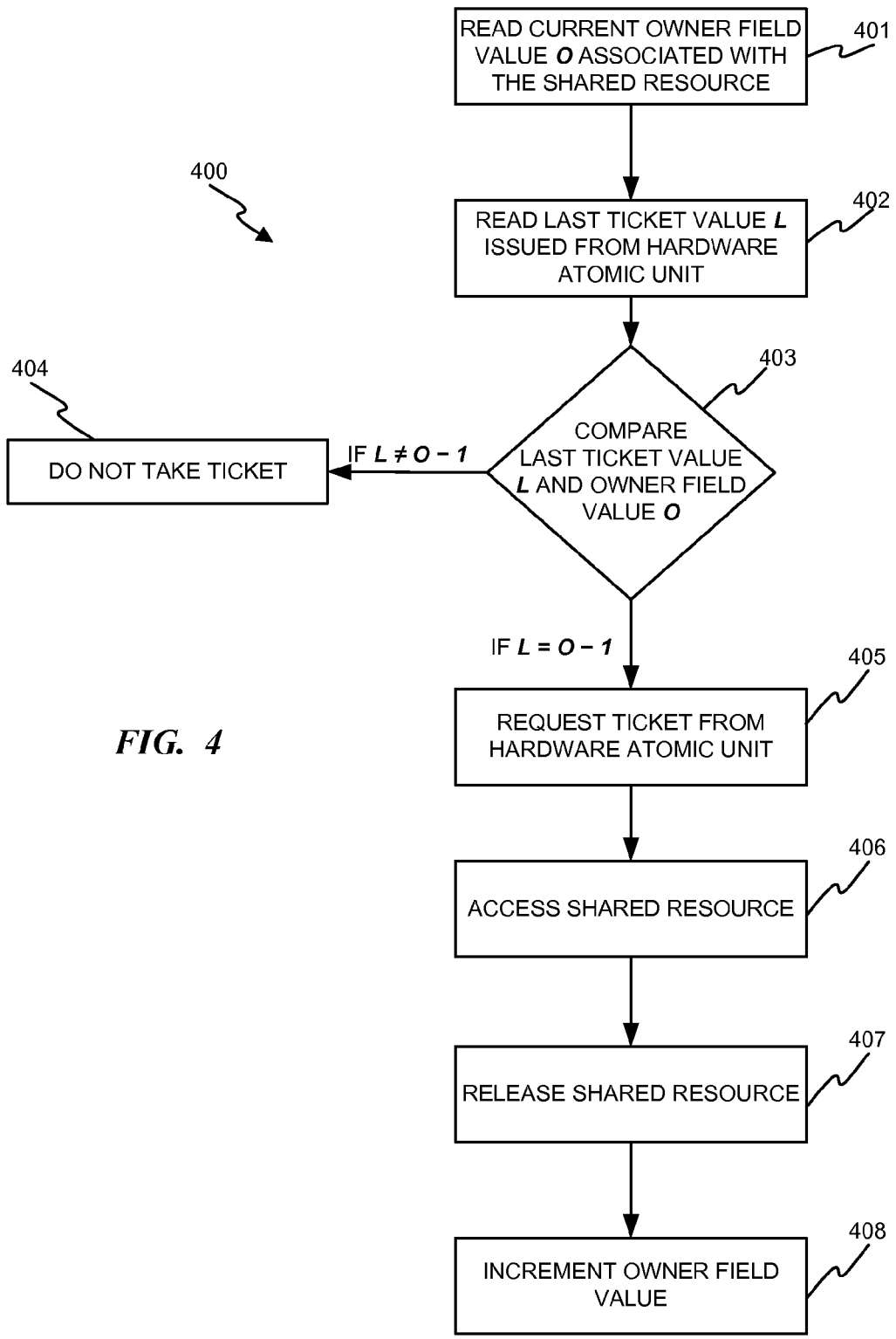
FIG. 4 is a flowchart illustrating a conditional access process for a shared resource according to one embodiment.

FIG. 4 is a flowchart 400 illustrating a conditional access process for the shared resource according to one embodiment. As noted above, once an execution unit receives a ticket, it must continue to monitor the current owner field to prevent the shared resource from being stalled. When the issued ticket number matches the owner field, then the execution unit must increment the owner field at a minimum, whether or not the execution unit actually accesses the shared resource. In some embodiments, an execution unit may not want to wait to access the shared resource if it is not immediately available. The process illustrated in FIG. 4 allows an execution unit to determine whether it can gain immediate access to the shared resource by "pulling" the next ticket.

In step 401, the execution unit reads the current owner field value O associated with the shared resource. In step 402, the execution unit reads the value L of the last ticket issued by the hardware atomic unit. In step 403, the execution unit compares the last ticket value L to the current owner field value O.

If the last ticket value L is one less than the current owner field value O (i.e. L=O−1), then the next ticket issued (i.e. L+1=T) will immediately own the resource. As illustrated in FIG. 3, when an execution unit completes its access and releases the shared resource (306), it then increments the owner field value (307). Accordingly, the next ticket in line will have access to the resource.

However, if the last ticket value L issued is greater than (O−1) where O is the current Owner field value, then the next ticket pulled will have to wait for access to the resource.

In flowchart 400, when the execution unit cannot gain immediate access to the shared resource (i.e. L≠O−1), then the process moves to step 404 and the execution unit does not take a ticket. Instead, the execution unit may proceed with other operations and may reattempt access to the shared resource at a later time and/or attempt to access a different resource.

On the other hand, when the execution will gain immediate access to the shared resource (i.e. L=O−1), then the process moves to step 405 where the execution unit requests a ticket from the hardware atomic unit. The process may then move immediately to step 406 where the execution unit accesses the shared resource. Alternatively, between steps 405 and 406, the execution unit may follow the process illustrated in FIG. 3 to verify that it actually has immediate access to the shared resource.

After the execution unit has completed its use of the shared resource, the process moves to step 407 where the execution unit releases the shared resource and then to step 408 where the execution unit increments the owner field value.

In other embodiments, the execution unit could simply read the next ticket value from the hardware atomic unit to determine if the next ticket matches the current owner of the shared resource. However, in some embodiments, such reading of the next value in the hardware atomic unit may be equivalent to issuing a new ticket, which would then require a device to continue to monitor owner field and to wait for a turn to access the shared resource and/or to increment the owner field. Instead, when a ticket is issued, the value of the last-issued ticket may be stored in a location that is accessible to the cores.

The process illustrated in flowchart 400 is for the case of concurrency level one, but may be generalized to allow higher concurrency levels N. For example, if the next ticket T minus the concurrency level N is less than the current owner value (i.e. T−N<O), then the next ticket T will not have to wait for access to the resource. In terms of the last ticket value L (i.e. L=T−1), this can be represented as L−N<O−1.

It will be understood that steps 301-307 of the process illustrated in FIG. 3 and steps 401-408 of the process illustrated in FIG. 4 may be executed simultaneously and/or sequentially. It will be further understood that each step may be performed in any order and may be performed once or repetitiously.

Many of the functions described herein may be implemented in hardware, software, and/or firmware, and/or any combination thereof. When implemented in software, code segments perform the necessary tasks or steps. The program or code segments may be stored in a processor-readable, computer-readable, or machine-readable medium. The processor-readable, computer-readable, or machine-readable medium may include any device or medium that can store or transfer information. Examples of such a processor-readable medium include an electronic circuit, a semiconductor memory device, a flash memory, a ROM, an erasable ROM (EROM), a floppy diskette, a compact disk, an optical disk, a hard disk, a fiber optic medium, etc.

The software code segments may be stored in any volatile or non-volatile storage device, such as a hard drive, flash memory, solid state memory, optical disk, CD, DVD, computer program product, or other memory device, that provides computer-readable or machine-readable storage for a processor or a middleware container service. In other embodiments, the memory may be a virtualization of several physical storage devices, wherein the physical storage devices are of the same or different kinds. The code segments may be downloaded or transferred from storage to a processor or container via an internal bus, another computer network, such as the Internet or an intranet, or via other wired or wireless networks.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A memory device having program instructions stored thereon that, upon execution by processor of a computer system, cause the computer system to:
    assign a current-owner value to a shared resource, the current-owner value identifying a ticket value that is eligible to be granted current access to the shared resource;
    issue a first ticket value to a first process by a ticket provider, the ticket provider configured to issue ticket values that are used to determine access to the shared resource;
    allow the first process to access the shared resource when a difference between the first ticket value and the current-owner value is equal to or smaller than a selected number of allowed concurrent processes, wherein the selected number of allowed concurrent processes is greater than one;
    increment the current-owner value when the first process has finished accessing the shared resource;
    obtain, by a second process, a last-issued-ticket value from the ticket provider without requesting a new ticket from the ticket provider, the last-issued-ticket value representing a value of a last ticket actually issued by the ticket provider to one of the plurality of processes;
    compare the current-owner value and the last-issued-ticket value;
    based upon the comparison, request a ticket for the second process from the ticket provider when a difference between the last-issued-ticket value and the current-owner value is equal to or smaller than the selected number of allowed concurrent processes; and
    based upon the comparison, do not request a ticket for the second process from the ticket provider when the difference between the last-issued-ticket value and the current-owner value is greater than the selected number of allowed concurrent processes.

2. The memory device of claim 1, wherein a process may access the shared resource immediately by taking a ticket when the last-issued-ticket value is equal to one less than current-owner value.

3. The memory device of claim 1, wherein a process will not achieve immediate access to the shared resource when the last-issued-ticket value is other than one less than the current-owner value.

4. The memory device of claim 1, wherein obtaining the last-issued-ticket value does not require reading a current ticket value at the ticket provider.

5. The memory device of claim 1, wherein the ticket provider is a hardware atomic unit.

6. A system, comprising:
a processor having a plurality of execution units; and
a memory coupled to the processor, the memory having program instructions stored thereon that, upon execution by the processor, cause the system to:
assign a current-owner value to a shared resource, the current-owner value identifying a ticket value that is eligible to be granted current access to the shared resource;
issue a first ticket value to a first process by a ticket provider, the ticket provider configured to issue ticket values that are used to determine access to the shared resource;
allow the first process to access the shared resource when a difference between the first ticket value and the current-owner value is equal to or smaller than a selected number of allowed concurrent processes, wherein the selected number of allowed concurrent processes is greater than one;
increment the current-owner value when the first process has finished accessing the shared resource;
obtain, by a second process, a last-issued-ticket value from the ticket provider without requesting a new ticket from the ticket provider, the last-issued-ticket value representing a value of a last ticket actually issued by the ticket provider to one of the plurality of processes;
compare the current-owner value and the last-issued-ticket value;
based upon the comparison, request a ticket for the second process from the ticket provider when a difference between the last-issued-ticket value and the current-owner value is equal to or smaller than the selected number of allowed concurrent processes; and
based upon the comparison, do not request a ticket for the second process from the ticket provider when the difference between the last-issued-ticket value and the current-owner value is greater than the selected number of allowed concurrent processes.

7. The system of claim 6, wherein the execution units receive a unique ticket number from the hardware atomic unit and are permitted access to the shared resource when the unique ticket number matches the owner value.

8. The system of claim 6, wherein the execution units are selected from one or more of threads, applications, and processes.

9. The system of claim 6, wherein the system further comprises a storage device storing the last-issued-ticket value and the current-owner value, wherein the storage device is selected from a direct-map cache location, a hardware register, or a memory location.

10. A method, comprising:
assign a current-owner value to a shared resource, the current-owner value identifying a ticket value that is eligible to be granted current access to the shared resource;
issuing a first ticket value to a first process by a ticket provider, the ticket provider configured to issue ticket values that are used to determine access to the shared resource;
allow the first process to access the shared resource when a difference between the first ticket value and the current-owner value is equal to or smaller than a selected number of allowed concurrent processes, wherein the selected number of allowed concurrent processes is greater than one;
incrementing the current-owner value when the first process has finished accessing the shared resource;
obtaining, by a second process, a last-issued-ticket value from the ticket provider without requesting a ticket from the ticket provider, the last-issued-ticket value representing a value of a last ticket actually issued by the ticket provider to one of the plurality of processes;
comparing the current-owner value and the last-issued-ticket value;
based upon the comparison, requesting a ticket for the second process from the ticket provider when a difference between the last-issued-ticket value and the current-owner value is equal to or smaller than a selected number of allowed concurrent processes; and
based upon the comparison, not requesting a ticket for the second process from the ticket provider when the difference between the last-issued-ticket value and the current-owner value is greater than the selected number of allowed processes.

11. The method of claim 10, wherein obtaining the last-issued-ticket value does not require reading a current ticket value at the ticket provider.

12. The method of claim 10, wherein the ticket provider is a hardware atomic unit.

* * * * *